(12) United States Patent
Chan et al.

(10) Patent No.: US 7,670,724 B1
(45) Date of Patent: Mar. 2, 2010

(54) ALKALI-HYDROXIDE MODIFIED POLY-VINYLIDENE FLUORIDE/POLYETHYLENE OXIDE LITHIUM-AIR BATTERY

(75) Inventors: Yuk Chan, Eatontown, NJ (US); Terrill B. Atwater, North Plainfield, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1403 days.

(21) Appl. No.: 11/031,943

(22) Filed: Jan. 5, 2005

(51) Int. Cl.
*H01M 2/16* (2006.01)
*H01M 2/14* (2006.01)

(52) U.S. Cl. .................. 429/248; 429/129; 429/131; 429/134; 429/135; 429/142; 429/247; 429/249; 429/251

(58) Field of Classification Search .......... 429/129, 429/131, 134, 135, 142, 247, 249, 251
See application file for complete search history.

(56) References Cited

U.S. PATENT DOCUMENTS

| 5,888,666 | A * | 3/1999 | Kawakami | 429/62 |
| 6,492,046 | B1 | 12/2002 | Payne et al. | |
| 2005/0164093 | A1* | 7/2005 | Otsuki et al. | 429/324 |
| 2005/0175894 | A1* | 8/2005 | Visco et al. | 429/212 |

* cited by examiner

*Primary Examiner*—Dah-Wei D Yuan
*Assistant Examiner*—Steven Scully
(74) *Attorney, Agent, or Firm*—Michael Zelenka; Stephen J. Harbulak

(57) ABSTRACT

A metal-air battery includes a housing having an aperture for the passage of air and a pair of electrodes that extend from the housing. An air cathode may be interconnected with one of the electrodes and an anode may include a metal foil that is interconnected with another of the electrodes. A separator may be interposed between the air cathode and the metal foil and a barrier layer may surround the metal foil. The barrier layer may function to substantially reduce the passage of moisture to the metal foil. A method of making a metal-air battery is also presented.

6 Claims, 3 Drawing Sheets

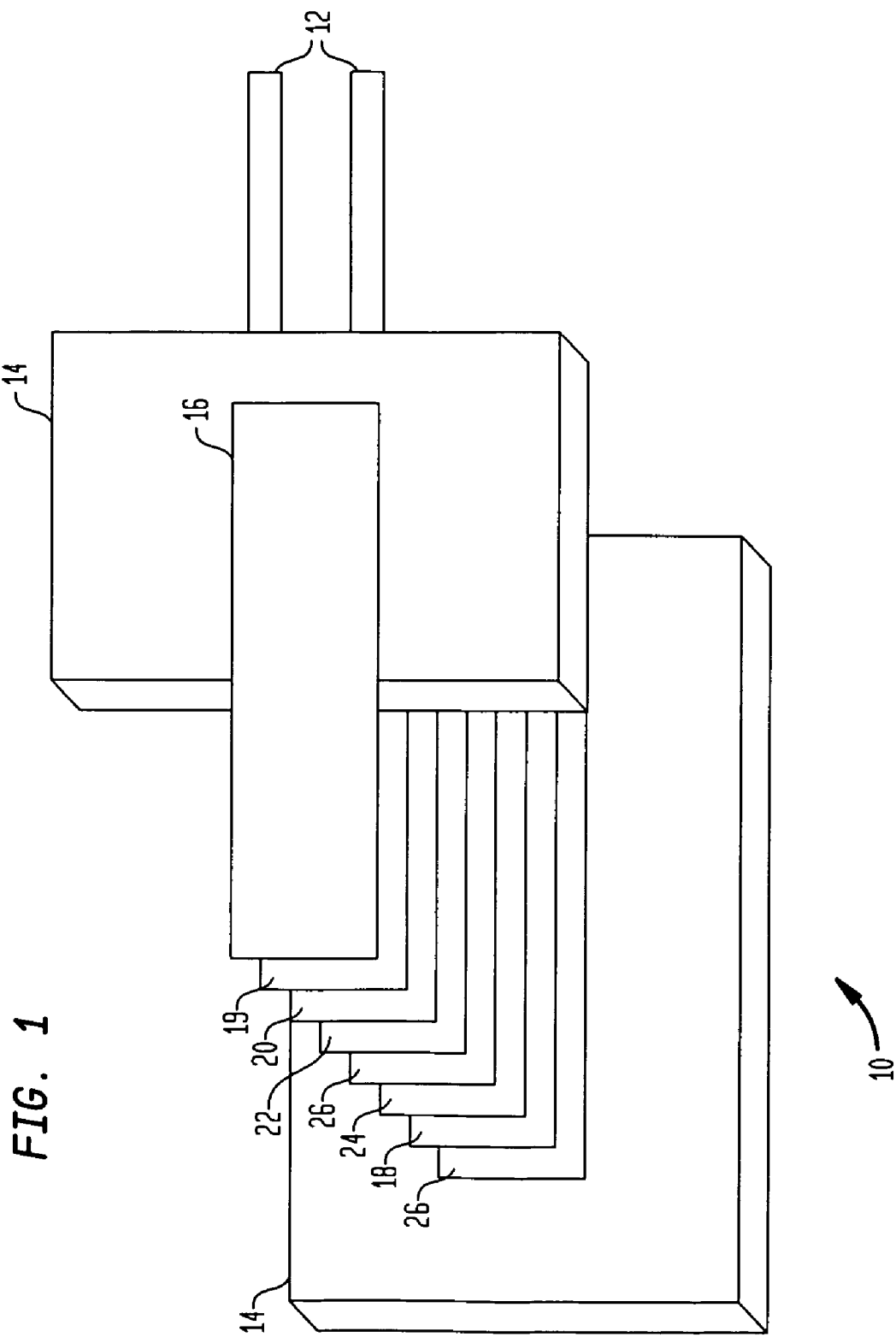

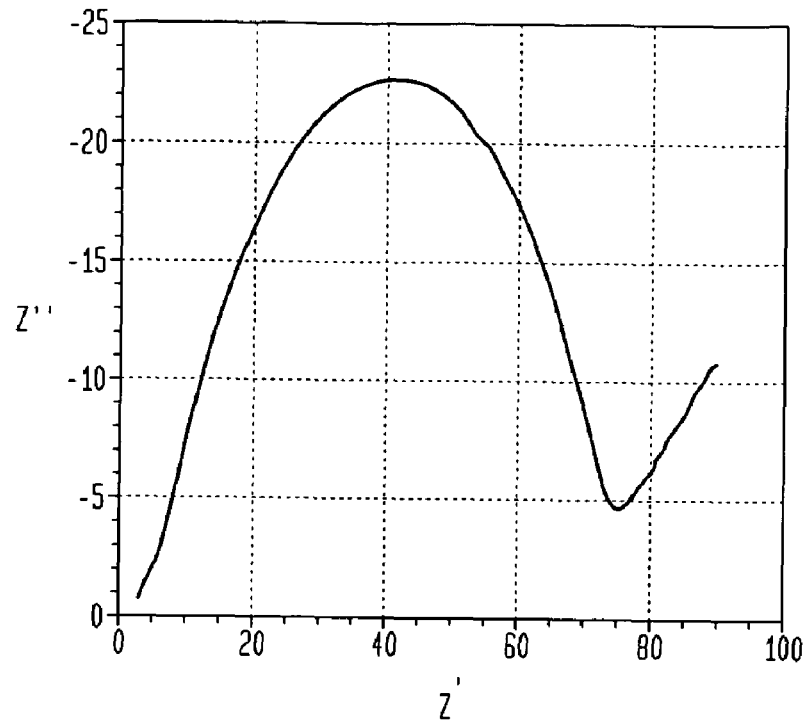
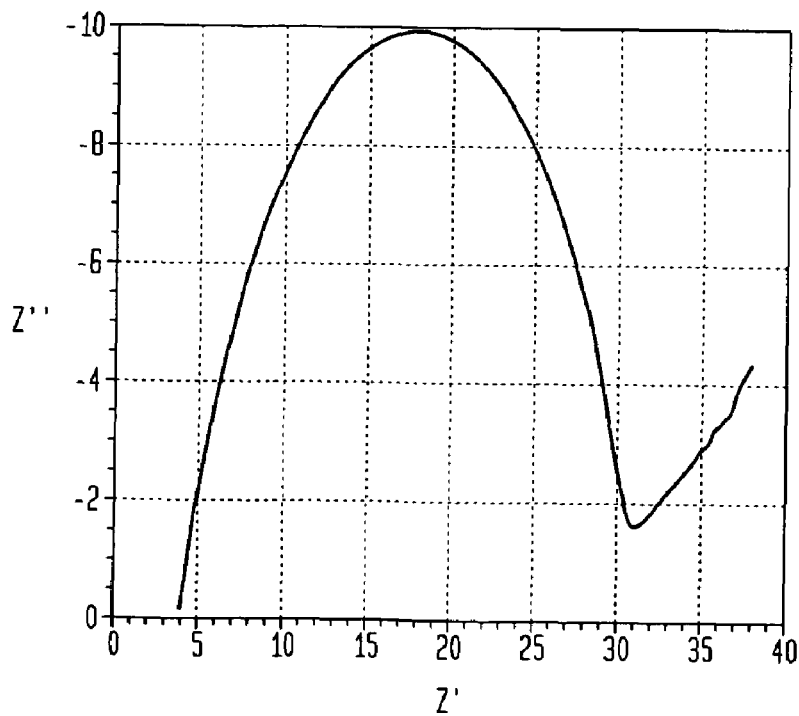

DISCHARGE OF LITHIUM-AIR BATTERY (A) @ 2mA

DISCHARGE OF LITHIUM-AIR BATTERY (B) @ 3mA

US 7,670,724 B1

ALKALI-HYDROXIDE MODIFIED POLY-VINYLIDENE FLUORIDE/POLYETHYLENE OXIDE LITHIUM-AIR BATTERY

GOVERNMENT INTEREST

The invention described herein may be manufactured, used, imported, sold, and licensed by or for the Government of the United States of America without the payment of any royalty thereon or there for.

BACKGROUND OF THE INVENTION

1. Field of the Invention

The present invention relates generally to electrochemical power sources and, more particularly, to metal-air batteries.

2. Related Art

Metal-air batteries may provide a very desirable power source for many small portable electronic devices. For example, lithium-air batteries may have a relatively large specific capacity of 3,861 Ah/kg and energy density of 13 kW-h/kg while also having relatively small spatial requirements. However, a problem that arises in the use of metal-air batteries involves, e.g., the non-compatibility of the metal with the moisture in the air. In particular, lithium may be oxidized violently in the presence of the moisture or water whereby safety concerns may be raised.

Currently, no suitable means of substantially reducing the effects of moisture in metal-air batteries is available.

SUMMARY OF THE INVENTION

In accordance with an embodiment of the present invention, a metal-air battery, comprises a housing including an aperture for the passage of air and a pair of electrodes which extend from the housing. An air cathode may be interconnected with one of the electrodes and an anode may comprise a metal foil that is interconnected with another of the electrodes. A separator may be interposed between the air cathode and the metal foil and a barrier layer may surround the metal foil and the barrier layer may function to substantially reduce the passage of moisture to the metal foil.

In another embodiment of the present invention, a method of making a metal-air battery, comprises preparing a barrier layer, comprising hydrolyzing polyvinylidene fluoride (pVdF) in an alkali-hydroxide solution to form a mixture; separating hydrolyzed pVdF from the pVdF and the alkali-hydroxide solution; dissolving hydrolyzed pVdF, polyethylene oxide (PEO) and lithium hexafluorophosphate in a solvent; and removing the solvent to thereby leave a polymer blend for use as a barrier layer. The method also comprises providing an anode comprising a metal foil; surrounding the metal foil with the barrier layer; providing an air cathode and a separator; immersing the metal foil and the barrier layer, the air cathode and the separator in an electrolyte; and providing a housing and hermetically sealing the metal foil and barrier layer, the air cathode and the separator in the housing.

BRIEF DESCRIPTION OF THE DRAWINGS

The following detailed description is made with reference to the accompanying drawings, in which:

FIG. 1 is an exploded view of a metal-air battery in accordance with an embodiment of the present invention;

FIG. 2 is a graph illustrating an AC impedance of a first example metal-air battery;

FIG. 3 is a graph illustrating an AC impedance of a second example metal-air battery;

DETAILED DESCRIPTION OF THE PREFERRED EMBODIMENT

Figure 4:
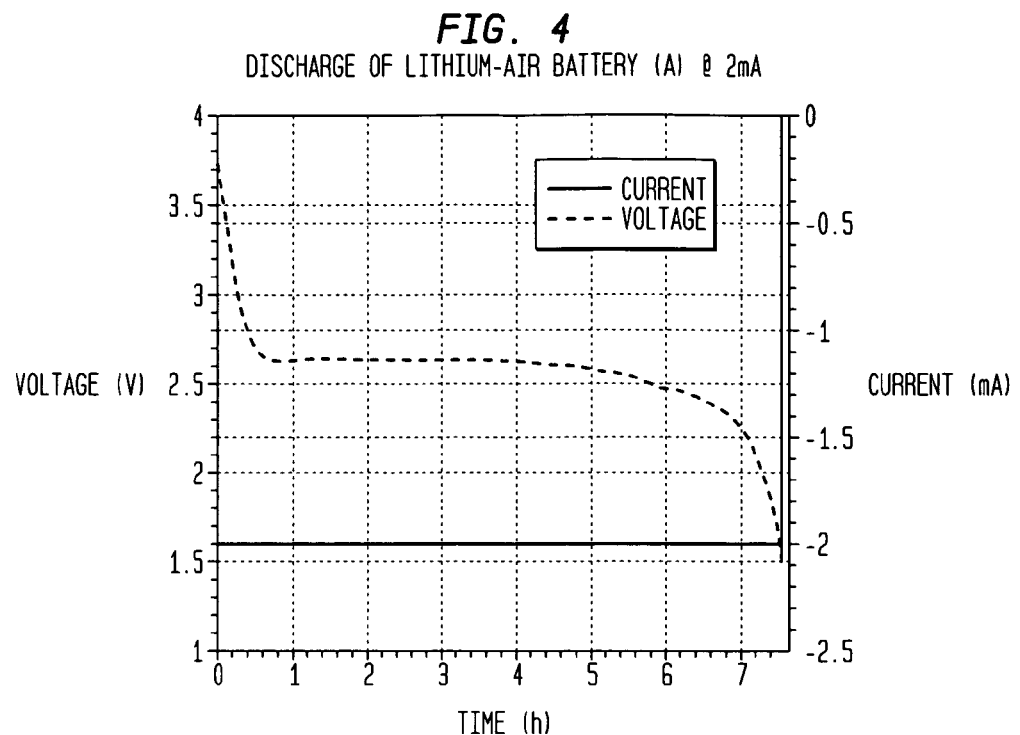
FIG. 4 is a graph illustrating a discharge of the first example metal-air battery.

One embodiment of the present invention concerns a metal-air battery that is configured to reduce a reaction between the metal and moisture in the air. In one particular embodiment of the invention, the stability of a lithium-air battery in a humid environment is enhanced by providing a barrier layer that surrounds the lithium metal. The barrier layer may comprise a modified polyvinylidene fluoride and a polyethylene oxide blend.

Referring now to the exploded view of FIG. 1, a metal-air battery that is in accordance with one embodiment of the present invention is illustrated generally at 10. In this embodiment, the metal-air battery 10 comprises positive and negative terminals 12 and a pouch or housing 14 having an aperture (not shown) for air that may be covered by an adhesive tape 16 prior to use. The terminals 12 extend from the housing 14 and preferably comprise a highly conductive substance such as a metal. The terminals 12 may be configured in any geometric shape that is suitable for mating with a device (not shown) to be energized. The housing 14 may comprise a moldable substance such as that having a polymeric composition. The adhesive tape 16 may include a Teflon composition and functions to hermetically seal the aperture of the metal-air battery 10 and may be removed when it is desired to operate the metal-air battery.

Disposed within the housing 14, is an operative layered assembly that may comprise wire-mesh layers 18 and 19, an air cathode 20, a separator 22, a metal foil 24, and barrier layers 26. The wire-mesh layers 18 may comprise a metallic substance such as nickel and are provided to enhance electrical contact across a surface (not numbered) of the air cathode 20 and the metal foil 24. The air cathode 20, may be electrically interconnected with one terminal 12, may comprise manganese dioxide and is reduced in known manner during operation of the metal-air battery 10. The separator 22 may comprise glass wool and may also function in a known manner. The metal foil 24 may function as an anode and may comprise a readily oxidizable substance such as lithium and is electrically interconnected with one terminal 12 via wire-mesh layer 18.

In accordance with a feature of the present invention, the barrier layers 26 are provided for substantially reducing contact between the metal foil 24 and moisture in the air. The barrier layers 26 may be joined together, during fabrication of the metal-air battery 10, to surround and cover the metal foil 24. It will be understood that while multiple barrier layers 26 are shown, these layers are referred to herein for illustrative purposes and instead of multiple barrier layers, a coating or encapsulating material may be employed to cover the metal foil 24.

As exemplified below, it has been found that the barrier layers 26 may comprise a polymer blend of polyvinylidene fluoride and polyethylene oxide. Also, an alkali-hydroxide solution may be employed in order to modify the chemical and physical characteristics of polyvinylidene fluoride prior to blending with the polyethylene oxide. Further, lithium hexafluorophosphate may be combined with the polymer blend of polyvinylidene fluoride and polyethylene oxide in order to conduct ions from the cathode and anode current collectors. Preferably, each barrier layer 26 comprises polyvinylidene fluoride that is greater than approximately 75 percent by weight and more preferably ranges between approximately 75 percent and 80 percent by weight. Polyethylene oxide preferably ranges between approximately 10 percent and 15 percent by weight and lithium hexafluorophosphate preferably ranges between approximately 10 percent and 15 percent by weight.

It is believed that during operation of the metal-air battery 10, the barrier layers 26 allow passage of lithium and oxygen ions in order to facilitate the oxidation and reduction reactions necessary for generation of electrical power. Lithium is oxidized to lithium carbonate and lithium oxide within the barrier.

In accordance with another feature of the present invention, a method of making a barrier layer 26 comprises reacting polyvinylidene fluoride (pVdF) in an excess lithium hydroxide solution. The reaction is continued until a dark brown paste settles to the bottom that may be 90% by weight efficient of initial pVdF. After centrifuging, the brown paste may be removed, rinsed with distilled water and then dried. The dried brown paste, comprising lithiated or hydrolyzed pVdF, may then be formed into a solid polymer blend film that may be used as a barrier layer.

In one particular embodiment, the polymer blend or barrier layer may be prepared by dissolving hydrolyzed pVdF in 1-methyl-2-pyrrolidinone (nMP) and then adding polyethylene oxide (PEO) and lithium hexafluorophosphate to form a polymer blend mixture. The polymer blend mixture may then be heated until all three components are dissolved. The mixture may then be allowed to cool to room temperature and formed into a thin layer by coating onto a flat sheet of Teflon or glass.

In accordance with another feature of the present invention, a method of making the metal-air battery 10 comprises providing an anode (not numbered) comprising the metal foil 24 and pressing the metal foil together with the wire-mesh layer 18. Excess nickel may be removed from the edges of the metal foil 24. The barrier layers 26, previously prepared of hydrolyzed pVdF/PEO as described above, may then be located on opposing sides of the metal foil 24 and then pressed together, e.g., under 5000 pounds per square inch of pressure. Next, the separator 22 may be provided along with the air cathode 20 that is pressed onto a nickel wire-mesh layer 19 and then coated on one side with a polymeric coating, e.g., Teflon to a thickness of approximately 0.003" inch. Thereafter, the anode (e.g. wire-mesh layer 18, metal foil 24 and barrier layers 26) and the separator 22 may be soaked in an electrolyte. When the anode and the separator 22 is saturated, the separator may be located on top of the air cathode 20 with the polymeric coating facing away from the air cathode. The anode is then placed on top of the separator 22. Next, the assembled anode, separator may be sealed in the housing 14 and an aperture may be cut therein to expose the polymeric coated side of the air cathode 20. Finally, adhesive tape 16 may be applied to cover the aperture of the housing 14 and to thereby hermetically seal the metal-air battery 10 for storage.

EXAMPLE I

A polyvinylidene fluoride (pVdF) was obtained from the Polyscience Corporation of Warrington, Pa. and Lithium hydroxide, a 98% solution, was obtained from Alfa Aesar Corporation of Ward Hill, Mass. Five grams of pVdF was placed into a 50 mL centrifuge tube. Thereafter, a three molar solution of lithium hydroxide was poured into the centrifuge tube until it reached the 50 mL line. The mixture was shaken and left for at least 24 hours. After 24 hours, the mixture turned from a white color to a pinkish color. More solid lithium hydroxide was put into the mixture to increase the degree of reaction. The mixture was shaken and left alone for another 24 hours. This process was repeated until a dark brown paste settled to the bottom of the centrifuge tube. At this point, the mixture was placed in a centrifuge for 10 minutes at 8000 rpm to separate the brown paste from the pinkish pVdF that floated on the top of the mixture. The brown paste was then removed and placed into an extraction thimble used in a Soxhlet apparatus. Distilled water was used to wash the brown paste of any traces of lithium hydroxide (thirty to forty washes). After the brown paste was removed, it was put into a vacuum dryer for about 24 hours at 100° C. The brown paste, now a powder, lithiated pVdF, was removed.

A polymer blend was prepared by dissolving 3.058 g of hydrolyzed pVdF in 1-methyl-2-pyrrolidinone (nMP). After the hydrolyzed pVdF dissolved, 0.410 g of polyethylene oxide (PEO), with an average molecular weight of 100K, obtained from the Aldrich Corporation of Milwaukee, Wis., and 0.450 g lithium hexafluorophosphate was added to the dissolved hydrolyzed pVdF solution. Altogether, the hydrolyzed pVdF comprised a weight percent of 78%, PEO comprised a weight percent of 10.5% and lithium hexafluorophosphate comprised a weight percent of 11.5%. The mixture was then heated until all three components were dissolved in nMP. The mixture was then cooled to room temperature and then applied, at a thickness of 0.002 inches, to a clean glass plate using a coating bar to form a barrier layer. The barrier layer or film was dried at 50° C. until the liquid evaporated and then placed into a vacuum oven for 24 hours at 50° C.

Lithium foil was obtained from the Foote Corporation of Exton, Pa. with a thickness of 0.006 inches for use as an anode. In a dry room, a press available from the Carver Corporation of Wabash, Ind. was employed to press, under 12 tons of pressure, the lithium foil onto a nickel wire-mesh. Excess nickel was removed from the edges of the lithium foil. The polymer blend of hydrolyzed pVdF/PEO or barrier layer was then disposed about the lithium foil and wire-mesh and pressed under 12 tons of pressure. Excess polymer blend was then removed.

A 1.2M solution of lithium hexafluorophosphate in propylene carbonate was provided for use as an electrolyte as its advantages include low toxicity, readily biodegradable, high boiling point, low evaporation rate, high flash point and is not damaging to the atmosphere.

An air cathode was obtained from the Electric Fuel Corporation of Auburn, Ala. The air cathode has twenty-four mg/cm$^2$ of active material, about seven % of which is gamma manganese dioxide, some or all of which may be reduced to a lower oxidation state. It was pressed onto a nickel wire-mesh under 25 pounds of pressure and then coated on one side with Teflon.

A metal-air battery was then assembled by placing the coated lithium metal and glass wool into the electrolyte. When the polymer coating and glass wool was saturated, the glass wool was placed on top of the air cathode with the Teflon coated side facing away. The polymer-coated lithium was then placed on top of the glass wool. The whole assembly was then placed into a polymer pouch or housing and vacuum-sealed. After sealing, a hole was cut in the polymer pouch to expose the Teflon side of the air cathode. Teflon tape was then adhered to the outer border of the polymer pouch and Teflon coated side of the air cathode to prevent air from entering the housing and contacting the air cathode prior to desired operation of the metal-air battery.

The metal-air battery according to Example I was discharged at 1 mA to 1.5 volts and was found to have a capacity of 9.2 mA.

EXAMPLE II

A metal air battery (A) was prepared according to Example I excepting that a barrier layer to protect a lithium foil instead comprised, in weight percent, 81% modified pVdF, 9% PEO and 10% lithium hexafluorophosphate. The lithium foil had a weight of 0.0214 g an area of 3.27 cm$^2$. The metal-air battery (A), as prepared, was discharged at 2 mA to 1.5 volts and was found to have a capacity of 15 mA.

Referring now to FIG. 2, a plot showing the results of testing of the metal air battery (A) of Example II for AC impedance is provided. In this example, the metal air battery had an overall real impedance of 90 ohms, which, as is known, is an important measure of the rate capability of the metal-air battery (A).

Referring now to FIG. 4, a plot showing the results of testing of the metal air battery (A) for both discharge current and voltage as related to time. This metal air battery maintained a discharge voltage of 2.6 volts over approximately 7.5 hours while providing approximately 2 mA of current.

EXAMPLE III

A metal-air battery (B) was prepared according to Example I excepting that a barrier layer to protect a lithium foil instead comprised, in weight percent, 78% modified pVdF, 10% PEO and 12% lithium hexafluorophosphate. The lithium foil had a weight of 0.0227 g an area of 3.17 cm$^2$. The metal-air battery (B) was discharged at 3 mA to 1.5 volts and was found to have a capacity of 16.8 mA.

Referring now to FIG. 3, a plot showing the results of testing of the metal air battery (B) of Example III for AC impedance is provided. In this example, the metal air battery had an overall real impedance of 37 ohms.

Figure 5:
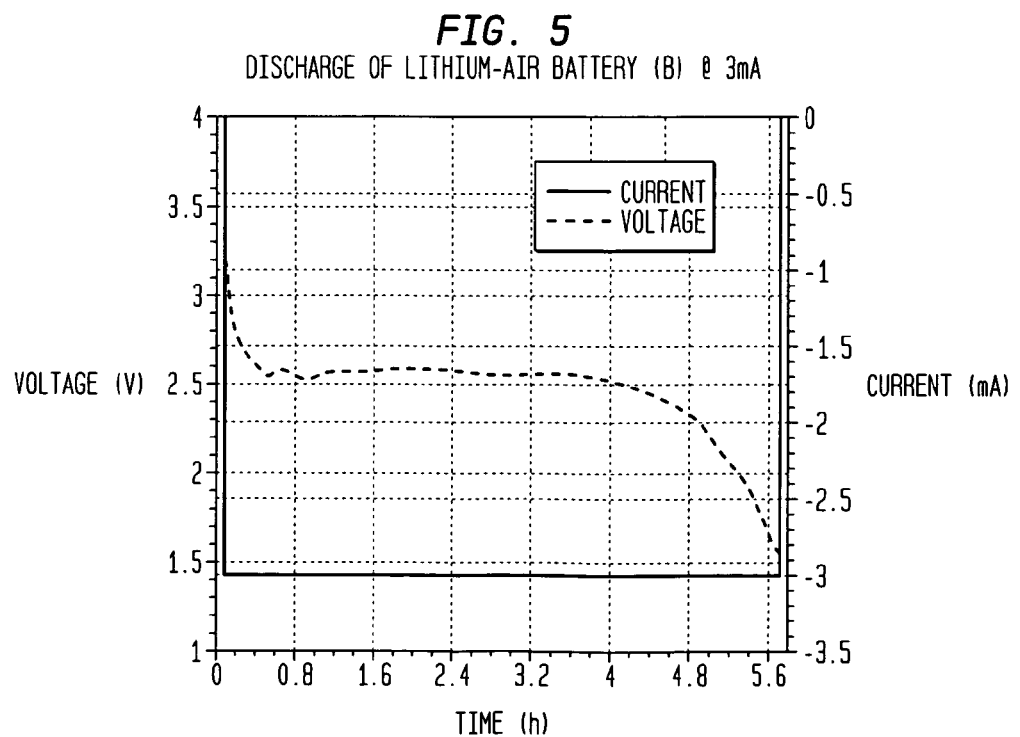
FIG. 5 is a graph illustrating a discharge of the second example metal-air battery.

Referring now to FIG. 5, a plot showing the results of testing of the metal air battery of Example III for both discharge current and voltage as related to time. This metal air battery maintained a discharge voltage of 2.5 volts over approximately 5.6 hours while providing approximately 3 mA of current.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A moisture-resistant lithium metal-air battery, comprising:
   a housing having an aperture to permit the passage of air;
   a pair of electrodes extending from the said housing;
   an air cathode interconnected with a one of said pair of electrodes;
   a metal foil anode being interconnected with another one of said pair of electrodes;
   a separator interposed between said air cathode and said metal foil anode; and
   a polymeric barrier layer surrounds said metal foil anode;
   a first wire-mesh layer is disposed adjacent said air cathode;
   a second wire-mesh layer is interposed between said metal foil anode and said polymeric barrier layer;
   said polymeric barrier layer, being composed of a mixture of alkali-hydroxide modified polyvinylidene fluoride, polyethylene oxide, and lithium hexafluorophosphate, allows a passage of lithium ions and oxygen ions therethrough to said metal foil anode;
   said alkali-hydroxide modified polyvinylidene fluoride being in a range of between about 75 percent by weight and about 85 percent by weight;
   said polyethylene oxide being in a range of between about 5 percent by weight and about 10 percent by weight;
   said lithium hexafluorophosphate being in a range of between about 10 percent by weight and about 15 percent by weight; and
   said passage of lithium ions and oxygen ions through said polymeric barrier layer to said metal foil anode causes a multitude of oxidation reactions and reduction reactions while substantially reducing unwanted contact between external moisture and said metal foil anode to generate electrical energy at an increased level of stability.

2. The moisture-resistant lithium metal-air battery as recited in claim 1, said mixture further comprising:
   said alkali-hydroxide modified polyvinylidene fluoride (pVdF) having a weight percent of about 81%;
   said polyethylene oxide (PEO) having a weight percent of about 9%; and
   said lithium hexafluorophosphate having a weight percent of about 10%.

3. The moisture-resistant lithium metal-air battery as recited in claim 1, said mixture further comprising:
   said alkali-hydroxide modified polyvinylidene fluoride (pVdF) having a weight percent of about 78%;
   said polyethylene oxide (PEO) having a weight percent of about 10%; and
   said lithium hexafluorophosphate having a weight percent of about 12%.

4. The moisture-resistant lithium metal-air battery as recited in claim 1, further comprising said metal foil anode, said polymeric barrier layer, and said separator being disposed within an electrolyte.

5. The moisture-resistant lithium metal-air battery as recited in claim 4, further comprising an electrolyte being a 1.2M solution of lithium hexafluorophosphate in propylene carbonate.

6. The moisture-resistant lithium metal-air battery as recited in claim 5, further comprising said separator being composed of glass wool.

* * * * *